United States Patent [19]
Sullivan et al.

[11] Patent Number: 5,510,163
[45] Date of Patent: Apr. 23, 1996

[54] OPTICAL STORAGE MEDIA HAVING VISIBLE LOGOS

[75] Inventors: Brian T. Sullivan; Li Li, both of Gloucester; Jerzy A. Dobrowolski, Ottawa; Peter D. Grant, Metcalfe, all of Canada

[73] Assignee: National Research Council of Canada, Ottawa, Canada

[21] Appl. No.: 245,699

[22] Filed: May 18, 1994

[51] Int. Cl.$^6$ .................................................. B32B 3/00
[52] U.S. Cl. ..................... 428/64.1; 428/64.2; 428/64.4; 428/457; 428/913; 428/915; 430/270.12; 430/495.1; 430/945; 283/82; 283/83
[58] Field of Search ................................ 428/64, 65, 457, 428/913, 915, 64.1, 64.2, 64.4; 430/270, 495, 945; 283/82, 83

[56] References Cited

U.S. PATENT DOCUMENTS

| | | | |
|---|---|---|---|
| 4,626,445 | 12/1986 | Dobrowolski | 427/7 |
| 4,705,356 | 11/1987 | Berning | 350/166 |
| 4,838,648 | 6/1989 | Phillips | 350/166 |
| 5,009,486 | 4/1991 | Dobrowolski | 350/164 |
| 5,298,305 | 3/1994 | Shinzuka | 428/64 |

FOREIGN PATENT DOCUMENTS 2058743  2/1990  Japan.

*Primary Examiner*—Patrick J. Ryan
*Assistant Examiner*—Elizabeth Evans
*Attorney, Agent, or Firm*—Neil Seitelbaum

[57] ABSTRACT

An optical recording medium for storing data is provided having a visible logo on a read side of the medium for providing some anticounterfeiting protection. A logo coating for producing the visible logo is carded by the read-side of the substrate; the coating has a sufficiently high transmittance at a read or write wavelength such that light at the read or write wavelength passing through the logo coating toward the other side of the substrate and reflected back through the logo is substantially transmitted and unchanged by the coating so that the data can be detected as well the coating is sufficiently light absorbing in the visible spectrum such that there is a visible contrast between the recording coating and the logo coating. In another embodiment, the logo coating forms a portion of a reflective recording layer on the other non-read side of the substrate. In this case, the logo coating is visually distinguishable from the rest of the recording layer and is made of a different material. For example, the logo may be gold and the rest of the recording layer may be aluminum, or vice versa.

22 Claims, 11 Drawing Sheets

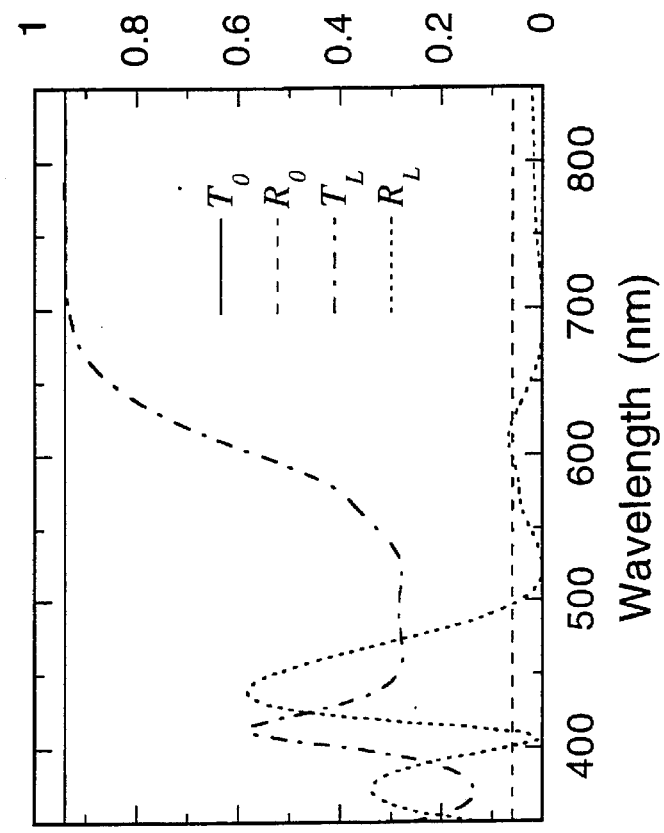
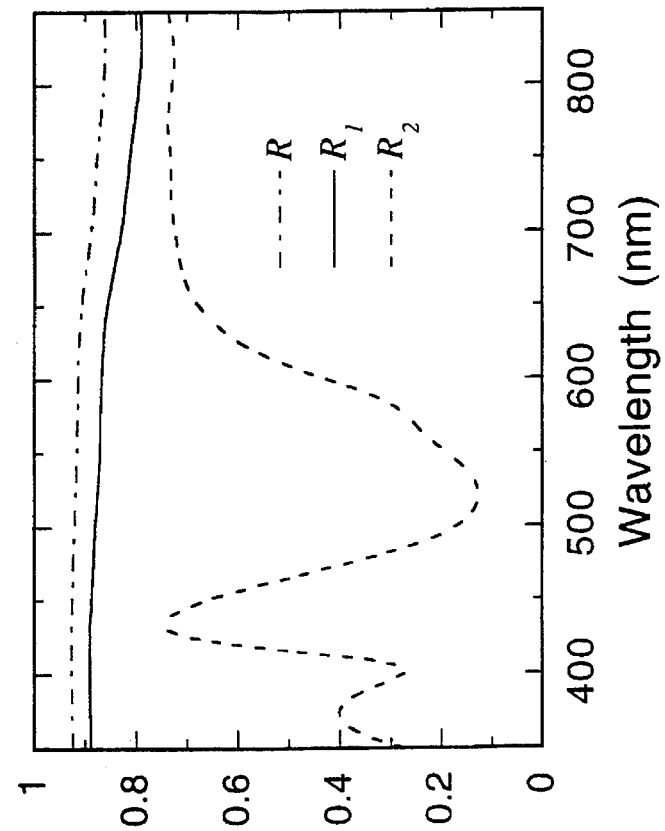
Fig. 3b
Fig. 3a

OPTICAL STORAGE MEDIA HAVING VISIBLE LOGOS

FIELD OF THE INVENTION

This invention relates to an optical recording medium having security features; more specifically, it relates to a recording medium that includes a logo on the read-side of the medium that does not interfere with the optical reading or writing properties of the medium.

BACKGROUND OF THE INVENTION

Optical media having a high data density are ideal for storing large amounts of information, such as reference data bases, newspapers and books, library files, etc. Some of these media are valuable and a potential target for counterfeiting. It is believed, that in the future, the counterfeiting of optical media will be a significant problem. Currently, some optical media are protected in a limited way by software or by electronic devices. In principle, security devices such as optical thin films, holograms, gratings and micro-prisms can be attached to optical media to protect them. However, in practice, these attached security devices cannot be placed on the read side of the optical medium without affecting its normal operation. Therefore, it would be desirable for the media to have a security feature on the read side of the medium which will not interfere with the normal operation of the media, making it more difficult for counterfeiters to copy.

Optical media are used for storing a variety of information such as the storing of music, video images, text, computer data and so forth in the form of digital data. Data can be stored on diskettes, passports, credit cards, bank cards and other articles. Currently, optically-variable security devices, such as thin films, holograms, gratings, micro-prisms, are commonly used to protect some of these articles on the non-read side of the optical media; their optical features can be easily recognized by the public at large. Optically variable thin film security devices exhibiting a color change with a shift in viewing angle have been disclosed in U.S. Pat. No. 3,858,977 issued in January of 1975 in the name of Baird et at. Such devices are successfully used on large denominations of Canadian bank notes and on drivers' licenses in some jurisdictions. To enhance the security of these devices, U.S. Pat. No. 5,009,486 issued Apr. 23 1991 in the name of Dobrowolski et at. describes a form depicting, optical interference authenticating device. Dobrowolski et al. teach the introduction of additional patterns in thin film security devices by using masks during their deposition or by infrared laser burning to remove one or more layers of the thin film system. However, none of the above security devices taught by these patents can be applied to the read side of optical media where they would be most effective.

Currently, compact discs, CD ROMs and other optical media are protected to a very limited extent by indicia such as logos that are applied to the non-read side of the disk or media. Lately, counterfeit copies of legitimate commercial software have been offered for sale; many of these copies include logos on the non-read side of the disk that fool many consumers into believing they are purchasing a legitimate product. As time passes, and the sophistication of counterfeiters increases, the illegitimate products they attempt to market are more difficult to discern from the legitimate ones.

OBJECT OF THE INVENTION

It is therefore an object of this invention to provide an optical storage medium that for some time will be difficult for counterfeiters to copy.

It is a further object of the invention to provide an optical storage medium having a logo on the read side of the medium that does not interfere with the normal operation of the medium.

STATEMENT OF THE INVENTION

In accordance with the invention, there is provided, an optical recording medium for storing data and having a visible logo thereon, comprising, a substrate; a recording coating carried by one surface of the substrate; and, a logo coating carried by the other surface of the substrate for producing the visible logo, the logo coating having similar reflection, transmission and absorption properties as that of the surface of the said substrate at the reading or writing wavelength(s) such that a light beam at the reading or writing wavelength(s) passing through the said logo coating and the substrate towards the recording coating and reflected back through the said logo coating and the substrate from the recording coating is substantially unchanged by the said logo coating compared to a similar propagating light beam having not passed through the said logo coating, so that the data can be written and read normally regardless of the existence of the said logo coating.

In accordance with another aspect of the invention, them is provided, an optical recording medium for storing data and having a visible logo thereon, comprising, a substrate; a recording coating carried by one surface of the substrate; and, a logo coating carried by the same surface of the substrate for producing the visible logo, the logo coating can be directly adjacent to the said surface of the substrate or can be part of the recording coating such that the combination of the logo coating and the recording coating has similar reflection, transmission and absorption properties as that of the recording coating alone at the reading or writing wavelength(s) such that a light beam at the reading or writing wavelength(s) reflected back from the said logo coating is substantially unchanged by the said logo coating compared to a light beam reflected back directly from the said recording coating, so that the data can be written and read normally regardless of the existence of the said logo coating.

In accordance with the invention, there is provided an optical medium for storing data and having a visible logo thereon, comprising: a substrate having a read-side and an other side; a reflective recording coating carded by the other side of the substrate; and, a logo coating for producing the visible logo carried by the read-side of the substrate, the coating having a sufficiently high transmittance at a read or write wavelength such that light at the read or write wavelength passing through the logo coating toward the other side of the substrate and reflected back through the logo is substantially transmitted and unchanged by the logo coating so that the data can be detected, wherein the logo coating and the reflective coating are visibly contrasting.

In yet another aspect of the invention a method is provided of fabricating an optical recording medium having a visible logo on a read-side of the medium. The method comprises the steps of: providing a substrate made of glass or plastic; grooving the first surface of the substrate and encoding the first surface with data if necessary; applying a recording coating and a protective layer to the first surface of the substrate; and, applying a logo coating to predetermined portions of the second surface or the read-side of the substrate, the said logo coating defining a visible logo being of a predetermined thickness and consisting of predetermined materials and having predetermined reflection, transmission and absorption properties such that the data can be written or read normally regardless of the existence of the said logo coating.

In yet another aspect of the invention there is provided, a thin film logo for placement on an optical medium having a recording layer, comprising: a substrate; and, a coating carried by the substrate for transfer from the substrate to the optical medium, the coating having sufficiently high transmittance at a laser wavelength such that light at this wavelength passing through the coated substrate toward the optical medium and reflected back through the coating from the medium is substantially transmitted and unchanged by the coating, so that the data can be detected, said coating having a visible contrast from the recording layer.

In yet another aspect of the invention there is a method of providing a laser readable optical medium having a visible logo on a read side of the medium, comprising the steps of: providing a substrate having a first side and a read side; encoding the a first side of the substrate with data; applying a reflective logo coating to the first side of the substrate, said coating defining a logo in contrast with the reflective coating visible from the read side of the substrate, said visible logo coating being of a predetermined thickness and a predetermined material such that light at a read wavelength reflected by the logo coating is substantially reflected and unchanged by the coating so that the data can be detected; and, applying a reflective coating to the encoded first side of the substrate.

The scope of this invention includes read-only, write-once, phase-change and magneto-optic media and the like defined hereafter to be of the type capable of storing digital data, and wherein the data is detected or read by using light of a specific wavelength.

BRIEF DESCRIPTION OF THE DRAWINGS

Exemplary embodiments of the invention will be described in conjunction with the drawings, in which:

FIGS. 3a and 3b are graphs showing the reflectance and transmittance curves of a CD ROM (Example 2) having a 7-layer out-of-focus plane superimposed visible logo of a specified color thereon;

DETAILED DESCRIPTION OF THE INVENTION

Figure 1:
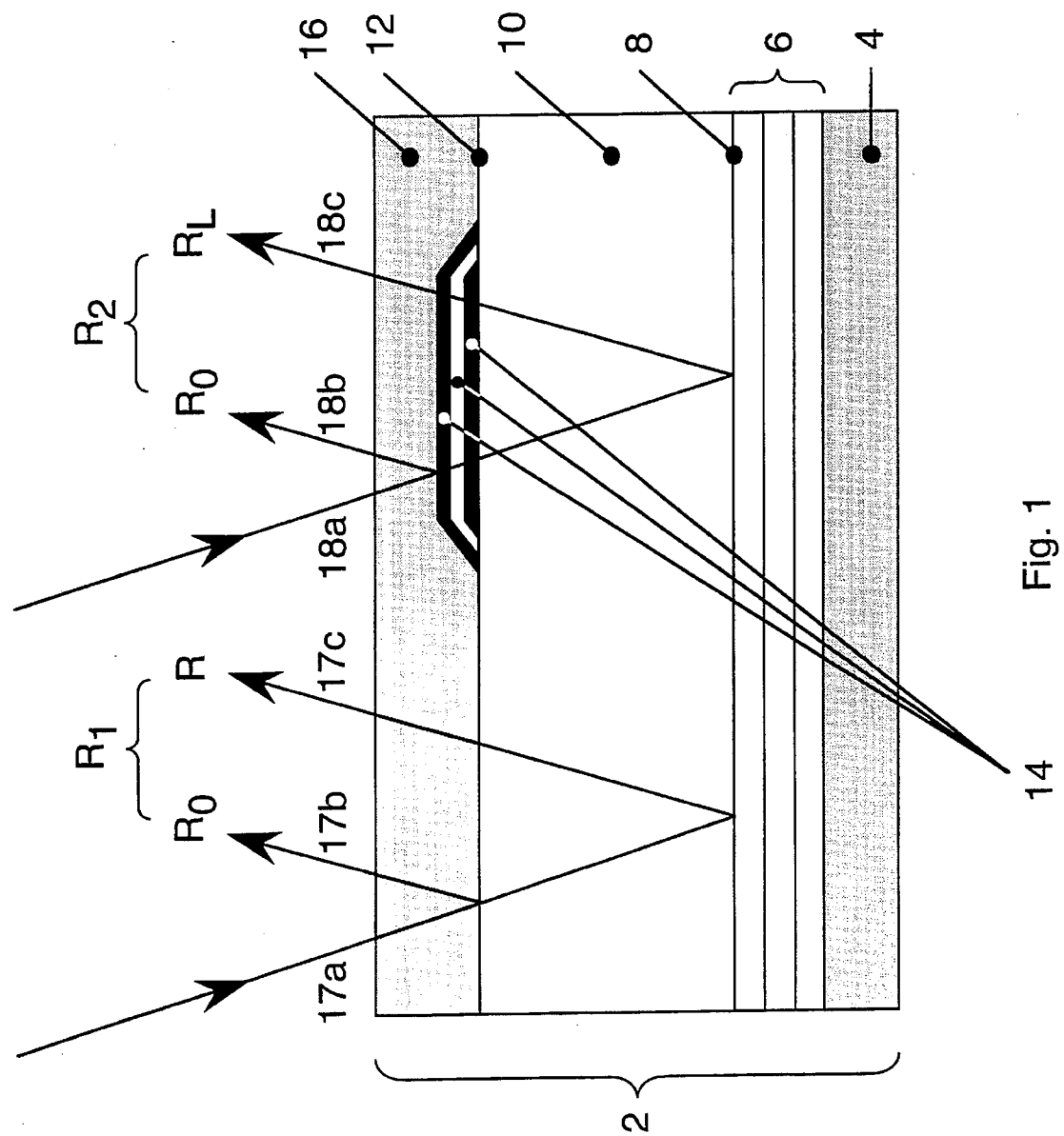
FIG. 1 is a cross-sectional view of a portion of an optical recording medium having an out-of-focus plane superimposed visible logo thereon.

A book by A. B. Marchant, entitled "Optical recording: A Technical Overview," New York, 1990, Addison-Welsley Publishing Company, provides a detailed review on the technical aspects of optical recording. In general, an optical recording medium is a device where digital data stored on the medium is detected or read by using light of a specific wavelength. The optical medium changes the intensity or the polarization state of the light after it is reflected off the optical medium, depending on the value of the digital data being read. The optical medium typically comprises a substrate which can be in the form of a disk, card, tape and the like and is made of glass or plastic; a recording coating having one or more layer that contains the digital information stored on the optical medium; and may include a protective layer. In the case of a read-only medium such as a CD ROM, information is embedded in the substrate; a recording coating is defined to be a highly reflecting metallic layer deposited adjacent to the embedded information side of the substrate. For a write-once medium, the recording layer includes an absorbing layer that can be ablated by a laser beam. In the case of a phase change medium the recording coating has at least one phase-change layer having a crystal state that can be changed by a laser beam, the change can be irreversible for a write-once medium and reversible for an erasable medium. In the case of a magneto-optic medium, the recording coating includes at least one layer made of a magneto-optic material whose magnetic state can be changed by a laser beam with the assistance of a bias magnetic field. The process is reversible so the magneto-optic medium can be used as an erasable medium.

Light used to read optical media usually passes through a thick substrate, typically 1–5 mm, and is focused onto a plane where the recording coating lies; this makes it less susceptible to dust on the surface of the optical medium. Alternatively, light can be focused directly on the recording coating plane without passing through a thick substrate. The side of a medium upon which the reading and writing light is incident, is referred to as the read-side. Currently, in all forms of optical recording media, such as CD ROMs, write-once media, phase-change media and magneto-optic media, the read-side of the media is kept completely clear and any descriptive text, trademarks, copyright indicia and other information are printed or coated on the other side of the substrate or in the none working area of the read-side. This makes it relatively easy for the optical recording media to be counterfeited.

As stated before, an objective of this invention is to superimpose thin film security devices in the form of visible logos to cover at least part of a read-side of the medium. This must be done without the superimposed visible logos interfering with the normal operation of the medium. An encoded data-bit having a binary value of "1" should be read as "1" whether or not the logo is present. There are many advantages of having such superimposed security devices on the media. First, the logos are easily distinguishable from the remaining area (or background) of the optical medium either by their color, contrast, or color change properties. Logos include many forms of indicia; for example the logos may be in the form of descriptive text, an index, special graphic images, trademarks and copyrights of the legitimate owners of the optical media such as software companies, music companies and banks and the like. Consumers would easily be able to recognize a counterfeited medium as being absent of logos on the read-side of the optical medium or having a wrong color logo on it. Second, the logos have to be deposited onto the read-side of the substrate through a specially designed mask requiring deposition equipment that may be expensive and not available to the counterfeiters. This may add to the production cost of the medium. However, in most cases the amount of information stored in the medium is more valuable and the cost to make the medium is only a fraction of the end product price. Therefore, legitimate owners may be ready to pay the extra cost to make their products more difficult to counterfeit. Third, in order to match the color, the contrast, or the color change properties of an authenticated device, the individual layers in the logos have to be controlled accurately and this will require skills and extra process control equipment as well. Fourth, and most importantly, in addition to the visual appearance of the logos, the existence of the logos should not interfere with the normal operation of the medium. The data to be read from or to be written to the medium should not be affected by the logos. Simply adding a logo that has a similar visual appearance to the authentic logos on the medium will not work because it will affect the normal operation of the medium. The logos have to be specially designed to obtain the desired visual appearance without affecting the laser reading and writing; this requires a high degree of skill. A final check of the authentication of a medium can be performed by simply reading or writing information from or onto the medium. In addition, the appearance of the logos can be specifically designed to obtain a particular color, contrast or color change properties for one product, or a series of products.

Two basic embodiments of the invention are provided. Depending on whether the logo lies in the out-of-focus plane or in the in-focus plane of the reading or writing light, the logos are divided into out-of-focus plane logos and in-focus plane logos, respectively. In the first case, the out-of-focus plane logos are relatively independent of the actual recording medium. However, in the second case, the in-focus plane logos are dependent on the recording coating and may actually be part of the recording coating.

Several examples of these two embodiments are designed and listed in Table 1 and Table 2, respectively. The optical recording wavelength is assumed to be in the near infrared region around 800 nm which is currently used in conventional optical recording. Of course, these embodiments can be designed for other laser wavelengths as well. Obviously, the same principle can also be applied to logos that can be detected by devices other than the human eye without departing from the spirit of the invention. The Commission Internationale de L'Eclairage (CIE) color coordinates and the optical recording performance of the examples described in Table 1 and Table 2 are summarized in Table 3 and Table 4, respectively.

Optical Recording Media Having Out-of-Focus Plane Visible Logos

A cross-sectional view of an out-of-focus plane embodiment of the invention is shown in FIG. 1. The medium 2 includes a substrate 10 that is made of plastic or glass, and can be in the form of a disk, card, tape and the like. The substrate has a bottom side 8 that is coated with a recording coating 6 and a protective layer 4; a top side 12, referred to hereafter as the "read-side", carrying a logo coating 14. The logo coating 14 includes at least one layer of a dielectric, semiconductor or metal material, or, alternatively, of an organic dye or ink, and is deposited through a mask and covers at least part of the working area of the medium and forms a visible logo which can be easily recognized. Alternatively, the logo coating can be coated using one of the above methods on the entire read-side and then be photolithographically etched to produce the logo patterns. An optional protective coating 16 is deposited over top of the logo 14 and the substrate 10.

For the purpose of illustration, a light beam for reading or writing information, when not propagating through the logo coating 14, shown as 17a, and passing through the substrate 10 and directly towards the location without a logo coating 14; the corresponding reflected light of 17a from the surface 12 and the recording coating 6 at the surface 8 are marked as 17b and 17c, respectively. The light beam, when propagating through the logo coating 14, is shown as 18a passing through the substrate 10, the corresponding reflected light of 18a are marked as 18b and 18c, respectively.

The reflectance of the light from the medium without and with the logo coating 14 are given by $R_1(\lambda)$ and $R_2(\lambda)$, respectively, where:

$$\begin{cases} R_1(\lambda) = R_0(\lambda) + \dfrac{T_0^2(\lambda)R(\lambda)}{1 - R_0'(\lambda)R(\lambda)} \approx \\ \qquad R_0(\lambda) + T_0^2(\lambda)R(\lambda) + \ldots \\ R_2(\lambda) = R_L(\lambda) + \dfrac{T_L^2(\lambda)R(\lambda)}{1 - R_L'(\lambda)R(\lambda)} \approx \\ \qquad R_L(\lambda) + T_L^2(\lambda)R(\lambda) + \ldots \end{cases} \quad (1)$$

In Equation (1), $R(\lambda)$ is the total reflectance of the recording coating 6, which may be low or high, depending on the value of data stored. $R_0(\lambda)$ and $T_0(\lambda)$ are the reflectance and transmittance of the surface 12; $R_L(\lambda)$ and $T_L(\lambda)$ are the reflectance and transmittance of the logo coating 14. $R_0'(\lambda)$ and $R_L'(\lambda)$ are the reflectances of the surface 12 and of the logo coating 14 for light incident from the opposite direction to the one shown in FIG. 1. The light reflected from the optional protective coating 16 is not included because it is the same for both 17a and 18a. The exact expressions in Equation (1) correspond to the case in which multiple reflections of the light off the recording coating 6 have been taken into account. The approximate expressions take into account only a single reflection of light off the recording coating 6. For cases in which only a part of the light beam passes through the logo coating 14, the actual reflectance will have a value that lies between $R_1(\lambda)$ and $R_2(\lambda)$.

Suppose that at the laser wavelength $\lambda_0$, $R^1_{min}$, is the minimum reflectance required to detect a "1" data bit and $R^0_{max}$ is the maximum permitted for a "0" data bit. If the stored data is to be unaffected by the presence or absence of the logo coating 14, then, $$\begin{cases} R_2(\lambda_0), R_1(\lambda_0) \geq R_{min}^1 & \text{'1' data bit} \\ R_2(\lambda_0), R_1(\lambda_0) \leq R_{max}^0 & \text{'0' data bit} \end{cases} \quad (2)$$

Ideally, $R_L(\lambda_0)$ and $T_L(\lambda_0)$ should be as close as possible to $T_0(\lambda_0)$, respectively. In the special case of a magneto-optic recording medium, in addition to the above requirements, the phase change properties of the two reflected beams $R_1(\lambda_0)$ and $R_2(\lambda_0)$ should also be the same. Furthermore, in order to make the logos visible, $R_1(\lambda)$ and $R_2(\lambda)$ should be different in at least part of the visible spectrum (380 nm $\leq \lambda \leq$ 780 nm).

Read-Only Optical Recording Medium Having Superimposed Out-of-Focus Plane Visible Logos In the case of a read-only optical recording medium, such as CD ROMs and the like, the recording coating 6 is usually made of a single layer of a highly reflective material such as aluminum, silver, gold, etc. Therefore, the reflectance $R(\lambda)$ across the visible spectrum will be high so that most of the light transmitted through the logo will be reflected back. If the logo has no absorption in the visible spectrum, the contrast between the logo and the background areas will be poor. This means that at least one of the materials used in the logo coating should be absorbing in at least part of the visible spectrum, while at the same time being transparent or absorbing very little at the reading and writing wavelengths.

Suppose that for a '0' data bit $R(\lambda_0)=R^0(\lambda_0)\approx 0$, and for a '1' data bit, $R(\lambda_0)=R^1(\lambda_0)\approx 1$. If these values of $R^0(\lambda_0)$ and $R^1(\lambda_0)$ are substituted into Equation (1), then we can get the following requirements for the reflectance and transmittance of the logo coating:

$$\begin{cases} R_L(\lambda_0) \leq R_{max}^0 \\ T_L^2(\lambda_0) \geq \dfrac{R_{min}^1 - R_L(\lambda_0)}{R^1(\lambda_0)} \geq \dfrac{R_{min}^1 - R_{max}^0}{R^1(\lambda_0)} \end{cases} \quad (3)$$

Thus, once the $R^0_{max}$ and $R^1_{min}$ values are specified, the maximum reflectance and the minimum transmittance of the logo coating at the reading and writing wavelength $\lambda_0$ can be determined from Equation (3). If these equations are satisfied, the logo coating 14 will not interfere with the operation of the reading and writing of the data from the optical medium.

Figures 2A, 2B:
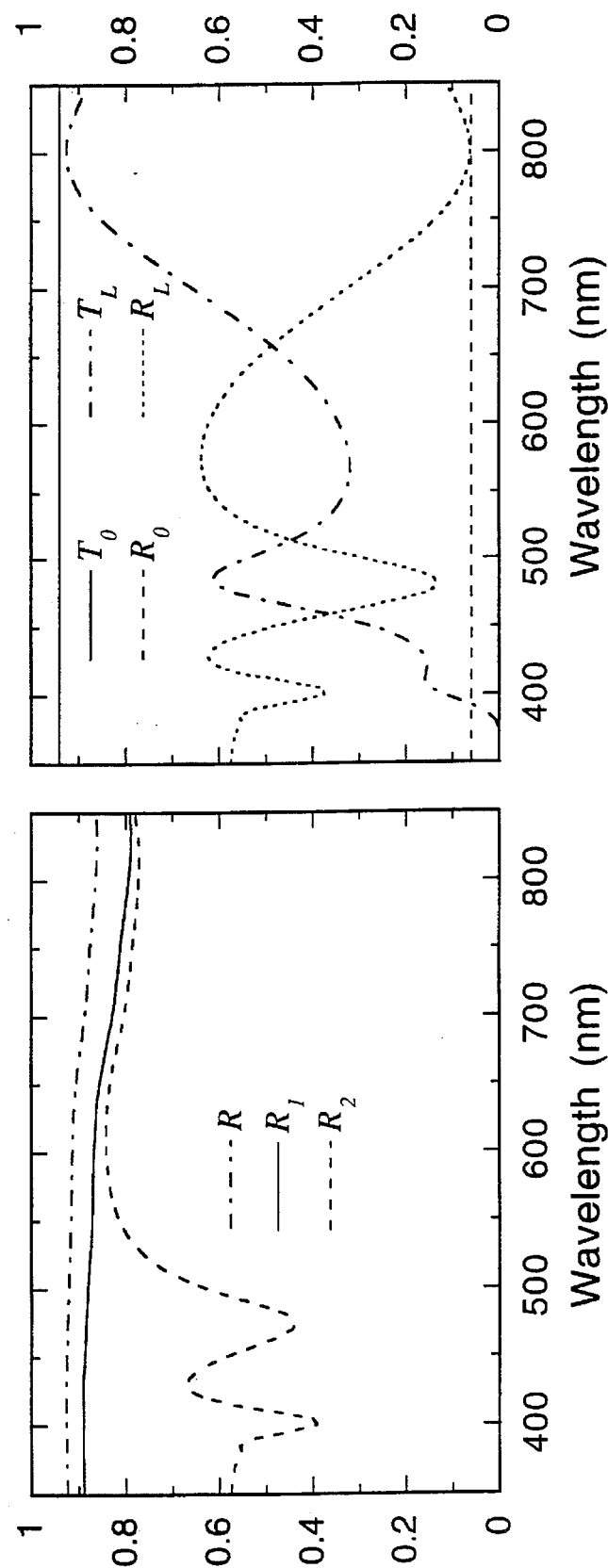
FIGS. 2a and 2b are graphs showing the reflectance and transmittance curves of a CD ROM (Example 1) having a single layer out-of-focus plane superimposed visible logo thereon.

In the simplest case, the logo coating 14 consists of a single layer of Si, SiO, $Fe_2O_3$, organic dye or ink, etc. The layer has a refractive index n at the reading and writing laser wavelength $\lambda_0$ of the optical medium, and a physical thickness t. Ideally, but not necessarily, the optical thickness of the layer, nt, is close to an integer multiple of $\lambda_0/2$. This will ensure that the transmittance of light through the logo at the wavelength $\lambda_0$ is as high as possible. The extinction coefficient of the material must be such that with this optical thickness the minimum reflectance and minimum transmittance of the logo at $\lambda_0$ satisfy Equation (3). Example 1 represents an optical recording medium having an aluminum recording layer and a single layer silicon logo coating at the interface 12. The reflectance curves without ($R_1(\lambda)$) and with ($R_2(\lambda)$) the logo coating for Example 1 are shown in FIG. 2a. FIG. 2b shows the calculated transmittance curves of $T_0(\lambda)$ and $T_L(\lambda)$. As expected, $R_1(\lambda_0)$ and $R_2(\lambda_0)$ are quite close at the laser wavelength, $\lambda_0=800$ nm, but different in the visible part of the spectrum. The logo has a brown color and this provides a high contrast with the rest of the recording medium which is not covered by the logo coating.

In experiments several commercial CDs with music and computer data were coated with the logo coating used for Example 1. No deterioration in the sound was observed when the music CDs with logo coatings were played. The computer CDs were also checked and the software stored in them was successfully read without errors.

To create logos that are even more difficult to counterfeit, a logo coating can include more than one layer. These can be made of absorbing, partially absorbing, or transparent materials, such as metals, semiconductors, dielectric materials, or organic dyes. At least one of the layers of the logo coating must be made of a material which is absorbing in at least part of the visible spectrum. As the number of the layers increases, it becomes possible to design logos with a particular color or color contrast at a specific angle. This makes the logo coating more difficult to counterfeit and therefore more secure. The recording layer in Example 2 is also an aluminum film. However, the logo coating consists of 7 layers made of $Nb_2O_5$, $SiO_2$ and Ge materials. The color of the logo at normal viewing angle is purple. The reflectance and transmittance curves of Example 2 with and without the logo coatings are shown in FIG. 3a and 3b, respectively. Once again, the minimum reflectance and maximum transmittance of the logo coating at the laser wavelength must satisfy Equation (3).

Figures 4A, 4B:
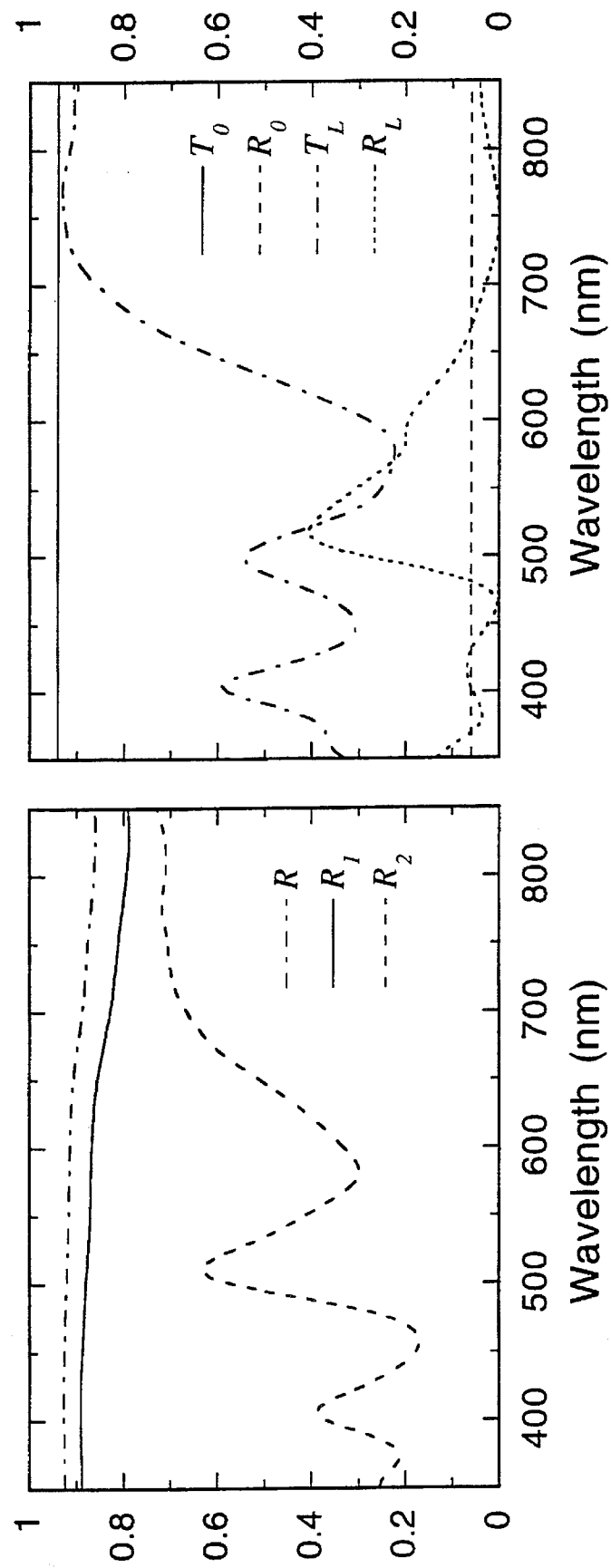
FIGS. 4a and 4b are graphs showing the reflectance and transmittance curves of a CD ROM (Example 3) having a 9-layer out-of-focus plane superimposed visible logo of specified colors at different viewing angles thereon.

An even more complex logo coating that changes color with angle of viewing can be made using the same group of materials. This makes it even more difficult to counterfeit. Example 3 represents a logo of this type. It consists of 9 layers made of $ZrO_2$, $SiO_2$ and Ge materials. The color of the logo coating is Yellowish green at normal incidence and purple at a 45° viewing angle. The reflectance and transmittance curves for Example 3 are shown in FIGS. 4a and 4b respectively.

Write-Once Optical Recording Medium Having Superimposed Out-of-Focus Plane Visible Logos In the case of a write-once optical recording medium, the recording coating includes at least one layer made of an absorbing material which can be ablated during the writing process by a focused laser beam. The logo coatings used in the above examples can be applied to the write-once optical recording media with little or no modification. Again, the minimum reflectance and maximum transmittance of the logo must satisfy Equation (3). The logo coatings can be designed with certain colors at a particular angle or color change properties with angle of viewing. Because the reflectance of the recording coating is not as high as that in the case of read-only media, logo coatings made of transparent all-dielectric materials will be also quite adequate for use in this case. It follows from Equation (1), that if $R(\lambda)$ differs from unity, $R_1(\lambda)$ and $R_2(\lambda)$ will be different across the visible spectrum region even if the logo coating does not absorb within this region. There will, therefore, be an adequate contrast between the logo the background areas.

Figure 5A:
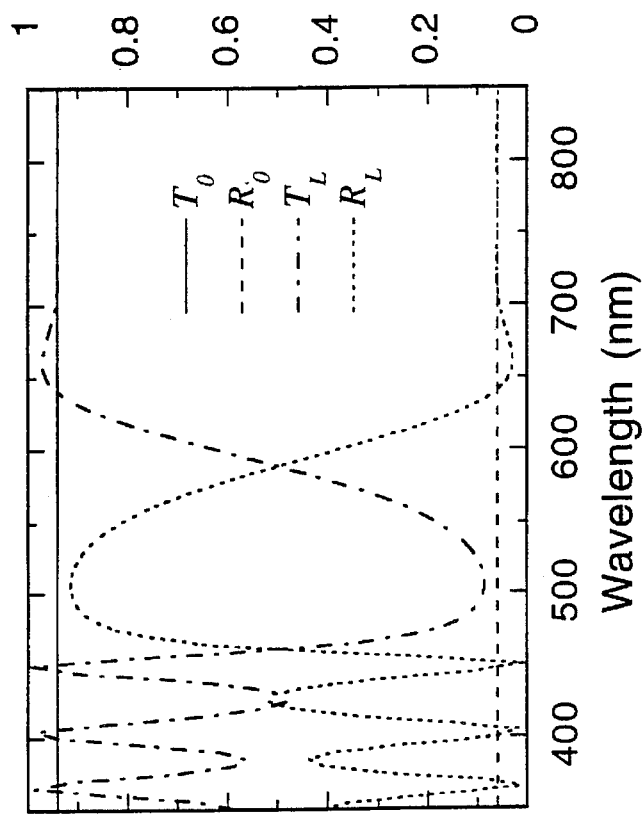
FIGS. 5a and 5b are graphs showing the reflectance and transmittance curves of a write-once optical recording medium (Example 4) having a 15-layer out-of-focus plane superimposed visible logo of a specified color thereon.
Figure 5B:
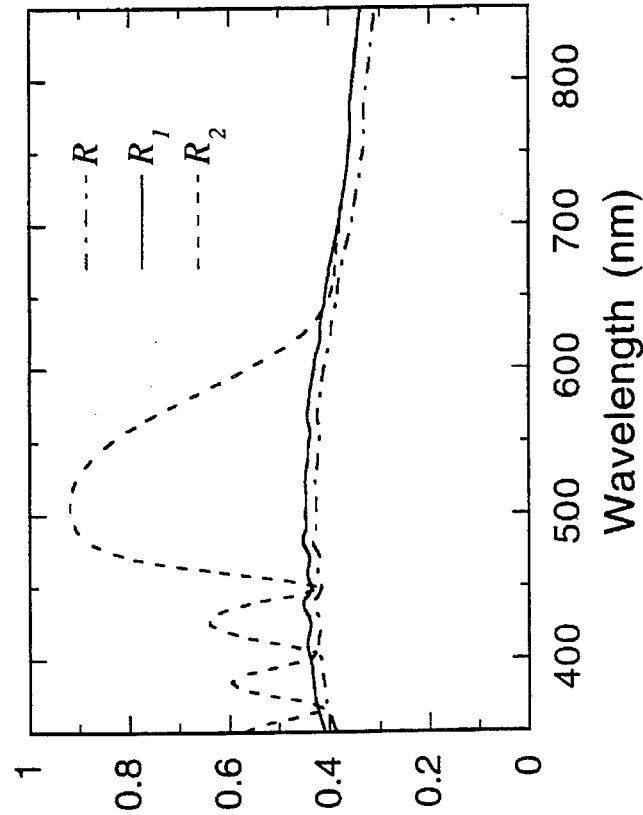

Example 4 is a write-once recording medium having a Te recording layer and a 15-layer logo coating made of $SiO_2$ and $ZrO_2$ materials. The reflectance and transmittance curves of the medium are shown in FIGS. 5a and 5b, respectively. The color of the logo coating is whitish green at normal incidence and whitish purple at a 45° viewing angle. The construction parameters of the system of Example 4 are also shown in Table 1.

Phase-Change Optical Recording Medium Having Superimposed Out-of-Focus Visible Logos In the case of a phase change recording medium, the recording coating 6 is made of a material having two stable phases such as TeGe, TeGeAs, TeGeSb, TeSeIn, TeSeSn, TeSnPb, GaSb, etc., in combination with some dielectric materials such as, $SiO_2$, $Al_2O_3$, $ZrO_2$, $Nb_2O_5$, etc. Once again, the visible logo coatings presented in Example 1, 2, 3 and 4 can be applied to phase-change optical media with little or no modifications. The logo coating can have certain color and color change properties as well.

Figure 6B:
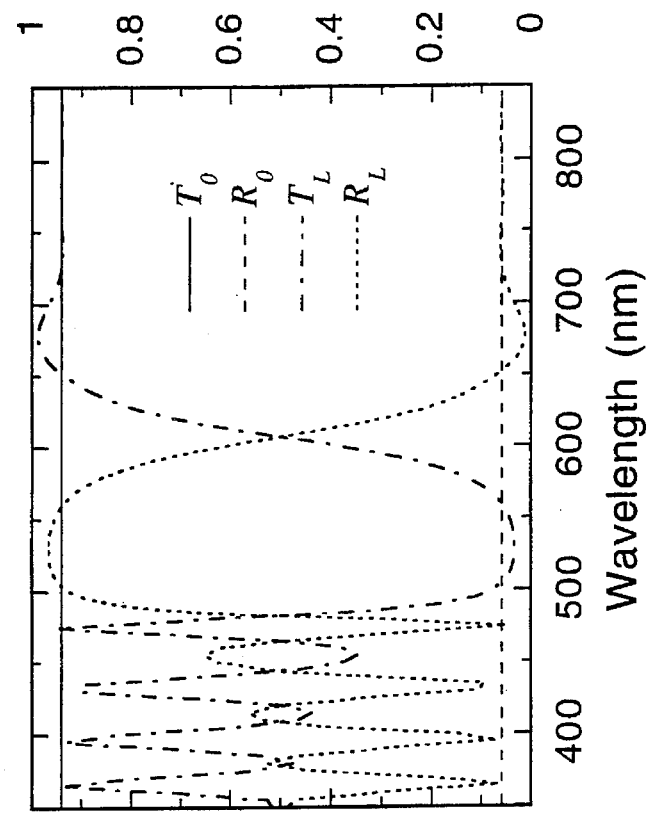
FIGS. 6a and 6b are graphs showing the reflectance and transmittance curves of a phase change optical recording medium (Example 5) having a 17-layer out-of-focus plane superimposed visible logo of a specified color thereon.
Figure 6A:
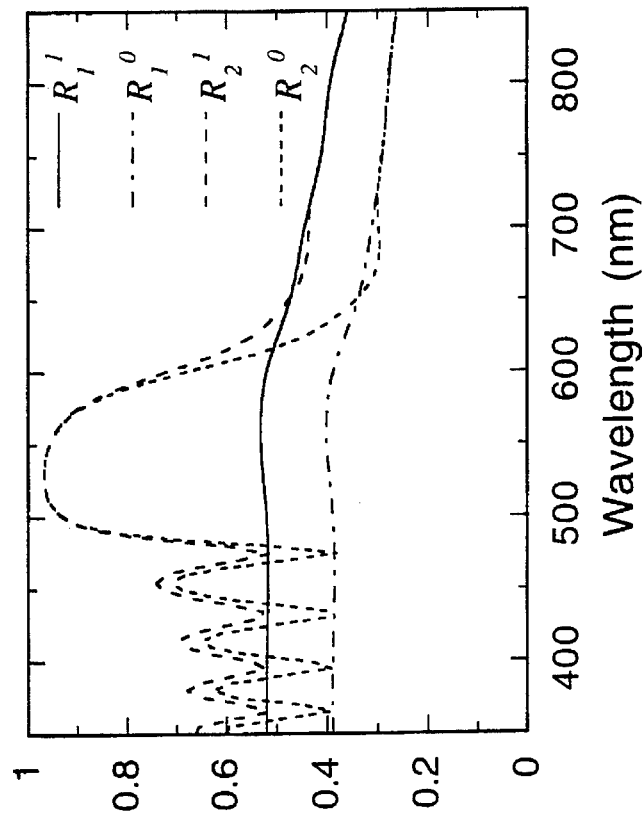

To demonstrate the principle, a phase-change recording medium (Example 5) having a GaSb recording layer and a 17-layer logo coating made of $SiO_2$ and $ZrO_2$ materials has been designed. The reflectance and transmittance curves of Example 5 are shown in FIGS. 6a and 6b respectively. The color of the logo is whitish yellow at normal incidence and whitish at a 45° viewing angle.

Magneto-Optic Recording Medium Having Superimposed Out-of-Focus Plane Visible Logos In the case of magneto-optic media, the recording coating 6 includes at least one layer made of a magneto-optic material such as CeSb, CeSe, CoPd, CoPt, EuO, Fe/Ag, Fe/Cu, Fe/TiN, GdCo, GdFe, GdFeBi, GdFECo, GdFeSn, GdTbFe, MnAlGe, MnBi, MnCuBi, MnGaGe, MnTiBi, TbFe, TbFeCo, TINS, TmSe, etc. In the magneto-optic media, data bits "0" and "1" are stored with the magnetic field oriented in the "up" or "down" direction. The data is read by detecting the rotation of the plane of polarization of a reflected polarized light beam. This rotation, called the Kerr rotation, is usually less than a few degrees, and hence the signal difference between "1" and "0" is also very small. In order to keep the same optical recording properties, the logo coating and the surface 12 should have not only the same reflectance value but also the same polarization properties at the laser wavelength. The logo coating can consist of at least one layer made of absorbing, partially absorbing and transparent materials.

Figure 7B:
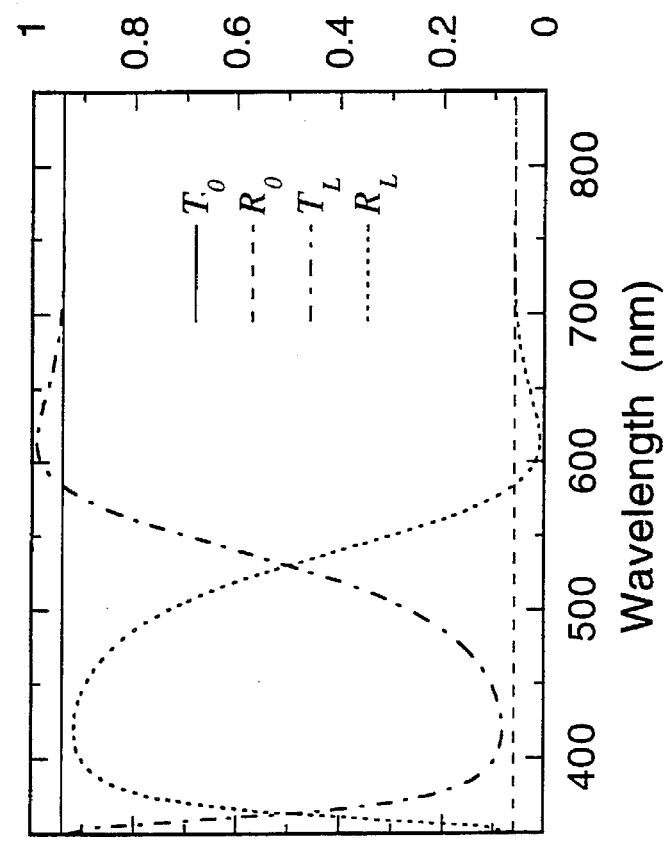
FIGS. 7a and 7b are graphs showing the reflectance and transmittance curves of a magneto-optic recording medium (Example 6) having a 7-layer out-of-focus plane superimposed visible logo of a specified color thereon.
Figure 7A:
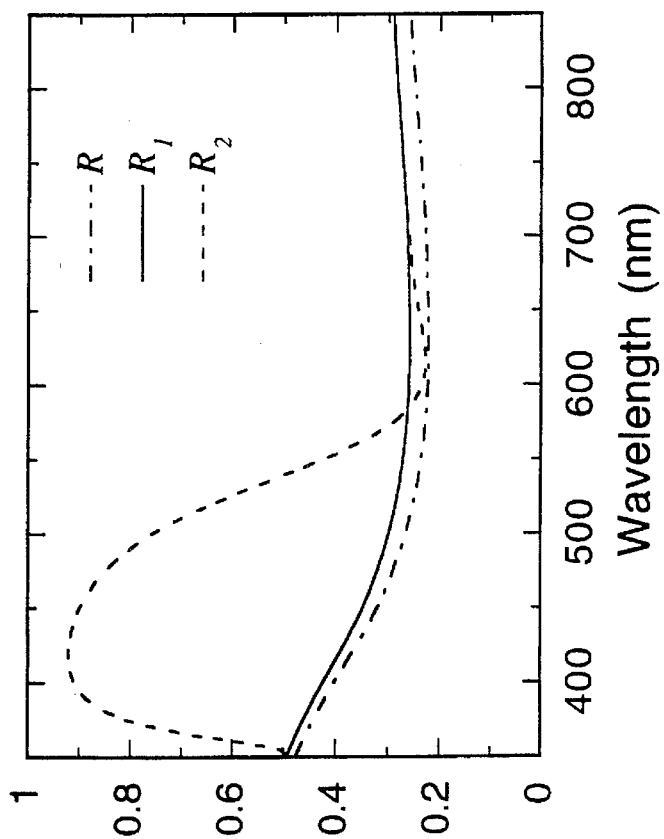

Example 6 represents a magneto-optic recording medium having a 2-layer recording coating made of TbFeCo and $Nb_2O_5$ materials and a 7-layer logo coating made of $SiO_2$ and $Nb_2O_5$ materials. The construction parameters for Example 6 are listed in Table 1. The reflectance and transmittance curves of the medium with and without the logo coating are shown in FIGS. 7a and 7b respectively. The Kerr rotation angles for the two areas are the same, 0.71°. The reflectance in the visible part of the spectrum is different, and hence the logo will be discerned. The color of the logo is greenish blue at normal viewing angle.

Optical Recording Media Having In-Focus Plane Visible Logos

Figure 8:
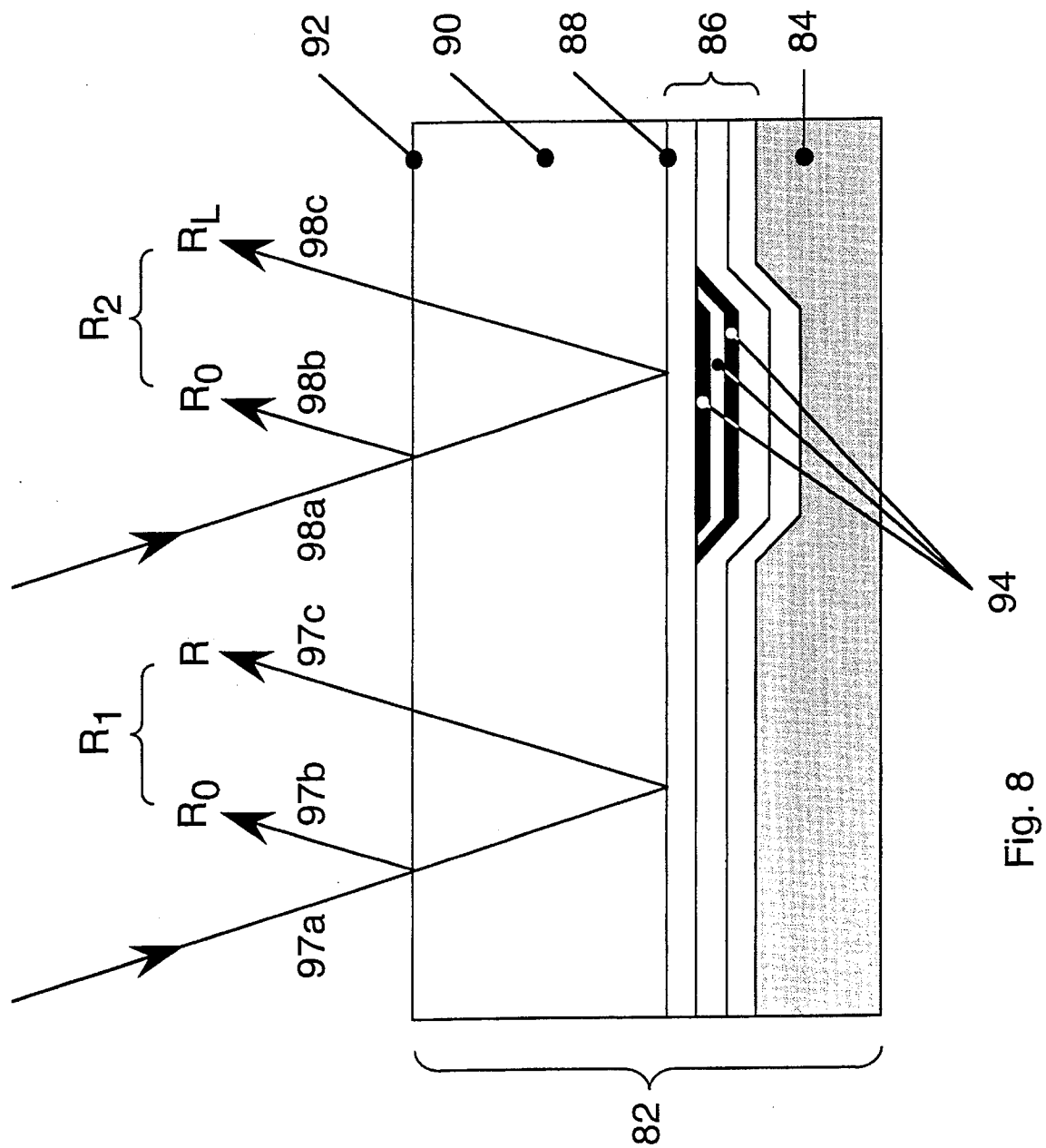
FIG. 8 is a cross sectional view of a portion of an optical recording medium having a in-focus plane superimposed visible logo thereon.

A cross-sectional view of the in-focus plane embodiments of the invention is shown in FIG. 8. The medium 82 includes a substrate 90 which is made of plastic or glass, and can be in the form of a disk, card, tape and the like. The substrate has a bottom side 88 that is coated with a recording coating 86 and a protective layer 84; and a top side 92, referred to hereafter as the "read-side", carrying a logo coating 94. The logo coating includes at least one layer made of a dielectric, semiconductor or metal material, or, alternatively, of an organic dye or ink, and is deposited through a mask onto part of the working area of the medium and forms a visible logo which can be easily recognized. Alternatively, the logo coating can be coated using one of the above methods on the entire read-side and then be photo-lithographically etched to produce the logo patterns. The logo coating may be applied on, under, within, or next to the recording coating which will hereafter be termed adjacent to the recording coating.

For illustration purposes, the light beam for reading or writing information which propagates directly towards a location without a logo coating 94, is shown as 97a passing through the substrate. This light is reflected from the surface 92 and from the surface 88 of the recording coating 86 and gives rise to beams 97b and 97c, respectively. The light beam 98a which propagates towards the logo coating is reflected at the surface 92 and, after passing though the substrate 90, by the logo 94, giving rise to beams 98b and 98c, respectively.

The reflectances of the light from the medium without and with the interaction of the logo coating 94 are given by $R_1(\lambda)$ and $R_2(\lambda)$, respectively, where:

$$R_1(\lambda) = R_0(\lambda) + \frac{T_0^2(\lambda)R(\lambda)}{1 - R_0'(\lambda)R(\lambda)} \approx R_0(\lambda) + T_0^2(\lambda)R(\lambda) + \ldots, \quad (5)$$

$$R_2(\lambda) = R_0(\lambda) + \frac{T_0^2(\lambda)R_L(\lambda)}{1 - R_0'(\lambda)R_L(\lambda)} \approx R_0(\lambda) + T_0^2(\lambda)R_L(\lambda) + \ldots$$

In this equation $R(\lambda)$ is the reflectance of the recording coating at the surface 88, which may be low or high, depending on the data stored. $R_0(\lambda)$ and $T_0(\lambda)$ are the reflectance and transmittance of the surface 92, $R_0'(\lambda)$ is the reflectance of the surface 92 in the opposite direction to that shown in FIG. 8. $R_L(\lambda)$ is the reflectance of the background. For the cases when only a part of the light passes through the logo coating 94, the actual reflectance for the beam will have a value that lies between $R_1(\lambda)$ and $R_2(\lambda)$.

Suppose that, at the laser wavelength $\lambda_0$, $R_{1min}$ is the minimum reflectance required to detect a "1" data bit and $R^0_{max}$ is the maximum reflectance permitted to detect a "0" data bit. In order for the stored data in the medium to be substantially unaffected by the presence or absence of the logo coating 94, the following expressions must be satisfied:

$$\begin{cases} R_2(\lambda_0), R_1(\lambda_0) \geq R^1_{min} & \text{'1' data bit} \\ R_2(\lambda_0), R_1(\lambda_0) \leq R^0_{max} & \text{'0' data bit} \end{cases} \quad (6)$$

For the special case of a magneto-optic recording medium, in addition to the above requirements, the Kerr rotation angles should also be unaffected by the presence or absence of the logo layers. Furthermore, in order to make the logos visible, $R_1(\lambda)$ and $R_2(\lambda)$ should be different in at least part of the visible spectrum.

Unlike the out-of-focus plane visible logos, the in-focus plane logo coating 94 is deposited either before or at the same time as the recording coating. Its structure and properties are closely associated with the recording medium. Therefore, any recording medium having such a superimposed visible coating will be more difficult to counterfeit than the out-of-focus embodiments. Besides meeting all of the requirements for optical recording mentioned before, the existence of the in-focus plane logo coating 94 should not introduce any significant change in the depth of focus of the medium. This requires more challenging logo design and more precise deposition control of the individual layers in both the logo coating 94 and the recording coating 86. This also makes such an optical medium more difficult to produce and therefore more secure.

Read-Only Optical Recording Medium Having Superimposed In-Focus Plane Visible Logos In the case of a read-only optical recording medium having a superimposed infocus plane logo, such as CD ROMs and the like, the recording coating 86 is usually made of a single layer of a highly reflective metal, such aluminum, silver, gold, etc. In order to make the logo visible, $R_2(\lambda)$ should be different from $R_1(\lambda)$ in at least part of the visible spectrum region. In the simplest case, the logo coating 86 consists of a single layer of a material which has similar reflectance and reflection phase to that of the recording layer at the laser wavelength but a different reflectance in the visible part of the spectrum. The logo coating is deposited on the surface 88 directly through a mask before the deposition of the recording coating 86.

Figure 9:
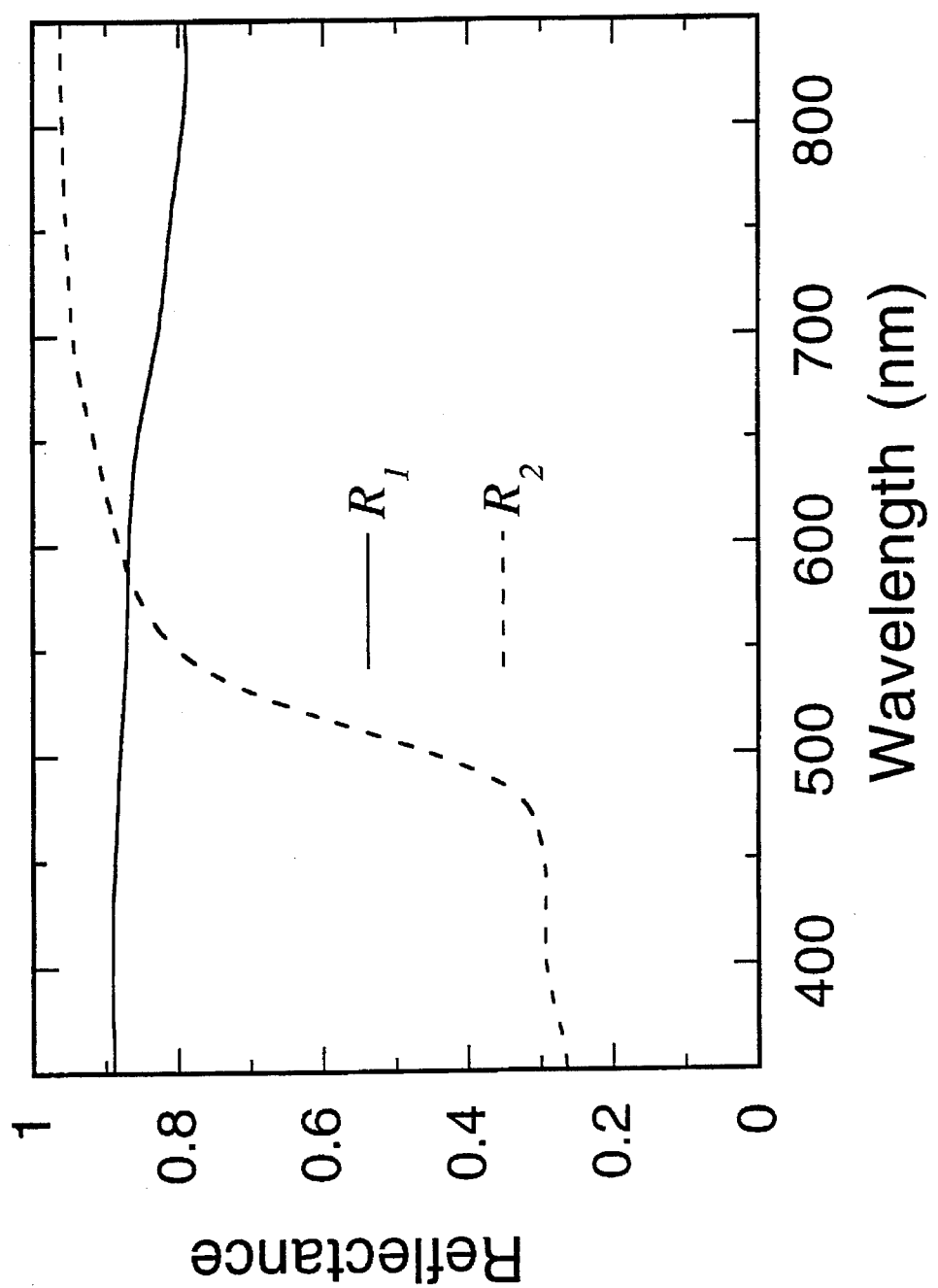
FIG. 9 is a graph showing the reflectance curves of a CD ROM (Example 7) having a gold layer in-focus plane superimposed visible logo of a golden color thereon.

Example 7 is a read-only optical recording medium having a gold logo coating and an aluminum recording layer. The thickness of the gold logo coating is of the order of 25 nm which will not introduce any significant change in the depth of focus of the medium. The reflectance curves $R_1(\lambda)$ and $R_2(\lambda)$ of Example 7 are shown in FIG. 9. Obviously, the reflectances $R_1(\lambda_0)$ and $R_2(\lambda_0)$ are close at the laser wavelength $R_1(\lambda_0)$ but different in the visible spectral region. Hence, there is a strong contrast between the gold color of the logo and the silvery color of the aluminum layer. The phase changes for $R_1(\lambda_0)$ and $R_2(\lambda_0)$ are the same and are equal to 180°.

In a more complicated case, a logo coating can be part of the recording coating and consist of more than one layer made of absorbing, partially absorbing and transparent materials, such as metals, semiconductors and dielectric materials. The logo is formed by depositing at least one layer of the recording layer through a mask. A small change in the thickness of the said layer will give the logo area a different color from the remaining areas of the recording medium but will not introduce substantial changes in $R_1(\lambda_0)$ and $R_2(\lambda_0)$, the phase changes on reflection, or in the depth of focus at $\lambda_0$. As the number of the layers in the recording coating 86 increases, more degrees of freedom become available for the design of the logo coatings with specific color, color contrast or color change properties for particular angles of viewing.

Figure 10:
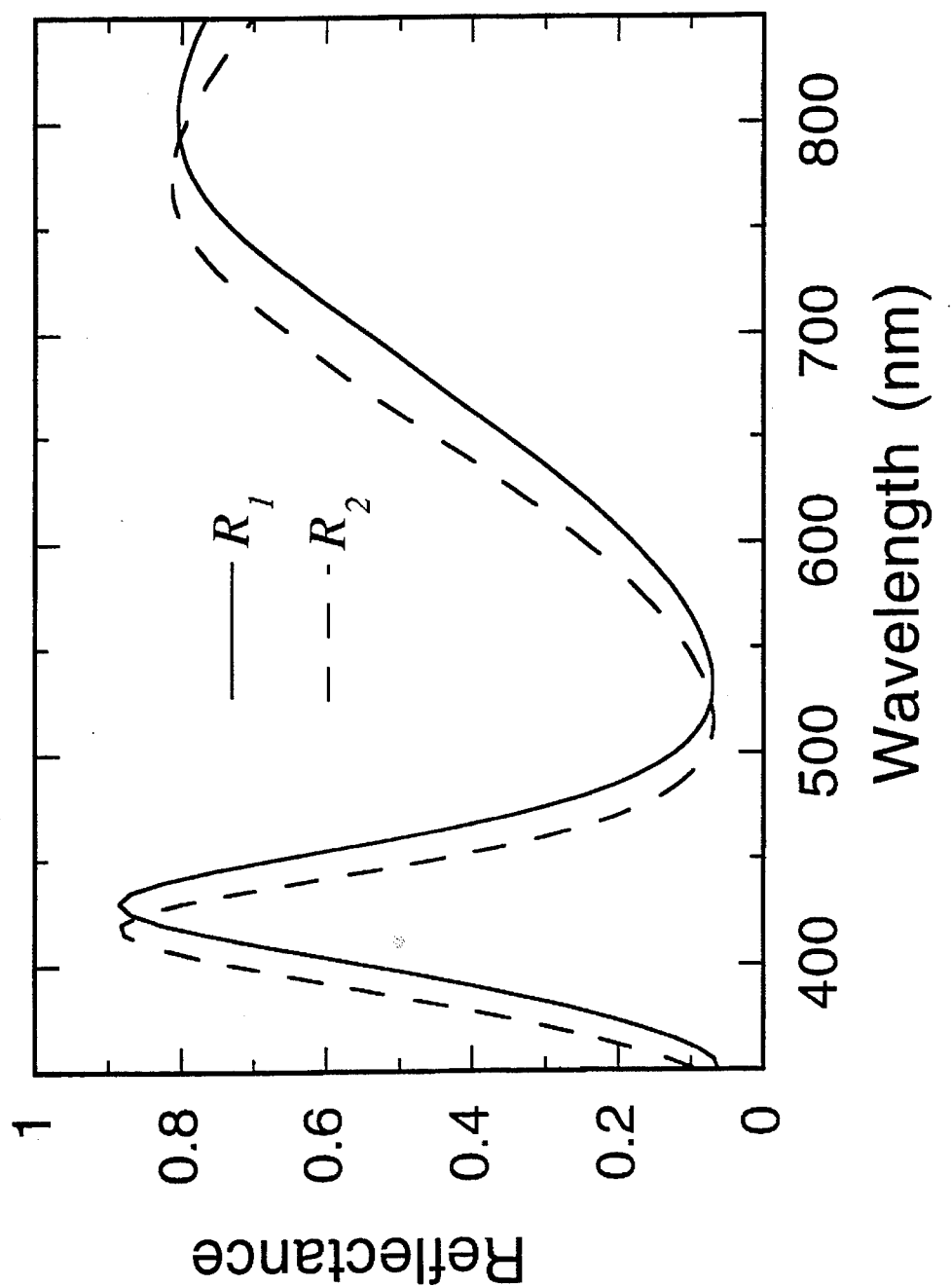
FIG. 10 is a graph showing the reflectance curves of a CD ROM (Example 8) having an in-focus plane superimposed visible logo of a specified color thereon; and, FIG. 11 is a graph showing the reflectance curves of a write-once optical recording medium (Example 9) having an in-focus plane superimposed visible logo of a specified color.

Example 8 is a read-only optical recording medium having a superimposed infocus plane logo 94 and a three layer recording coating made of Inconel, $Nb_2O_5$ and aluminum materials. The logo coating shares several layers with the recording coating. The construction parameters of the coating of Example 8 are listed in Table 3. A thin, partially transparent, Inconel layer is deposited first onto the surface 88 of the substrate 90, followed by 96% of the $Nb_2O_5$ layer. A mask is introduced at this stage and used during the deposition of the remaining 4% of the $Nb_2O_5$ layer. The mask is then removed and the aluminum and protective layers are then deposited. The reflectance curves for $R_1(\lambda)$ and $R_2(\lambda)$ are plotted in FIG. 10. Obviously, $R_1(\lambda)$ and $R_2(\lambda)$ have the same value at the laser wavelength $\lambda=\lambda_0$, but are different in the visible part of the spectrum. The phase of the two beams are 170° and 178°, respectively, virtually unchanged. The colors of the logo and background areas of the medium are purple and violet at the normal viewing angle, changing to purplish pink and purple at 45° angle of incidence, respectively. This means both the logo and the background change colors with viewing angles.

Write-Once Optical Recording Medium Having Superimposed in-Focus Plane Visible Logos In the case of a write-once optical recording medium, the recording coating includes at least one layer made of an absorbing material which can be ablated or marked during the writing process by a focused laser beam. The logo coatings consist of at least one dielectric, semiconductor or metal layer, and can be deposited directly onto the surface 88, or be part of the recording coating 86. As the numbers of layers in the recording coating and the logo coating increase, the colors and color change properties of the logo and background areas can be designed to meet desired specifications.

Figure 11:
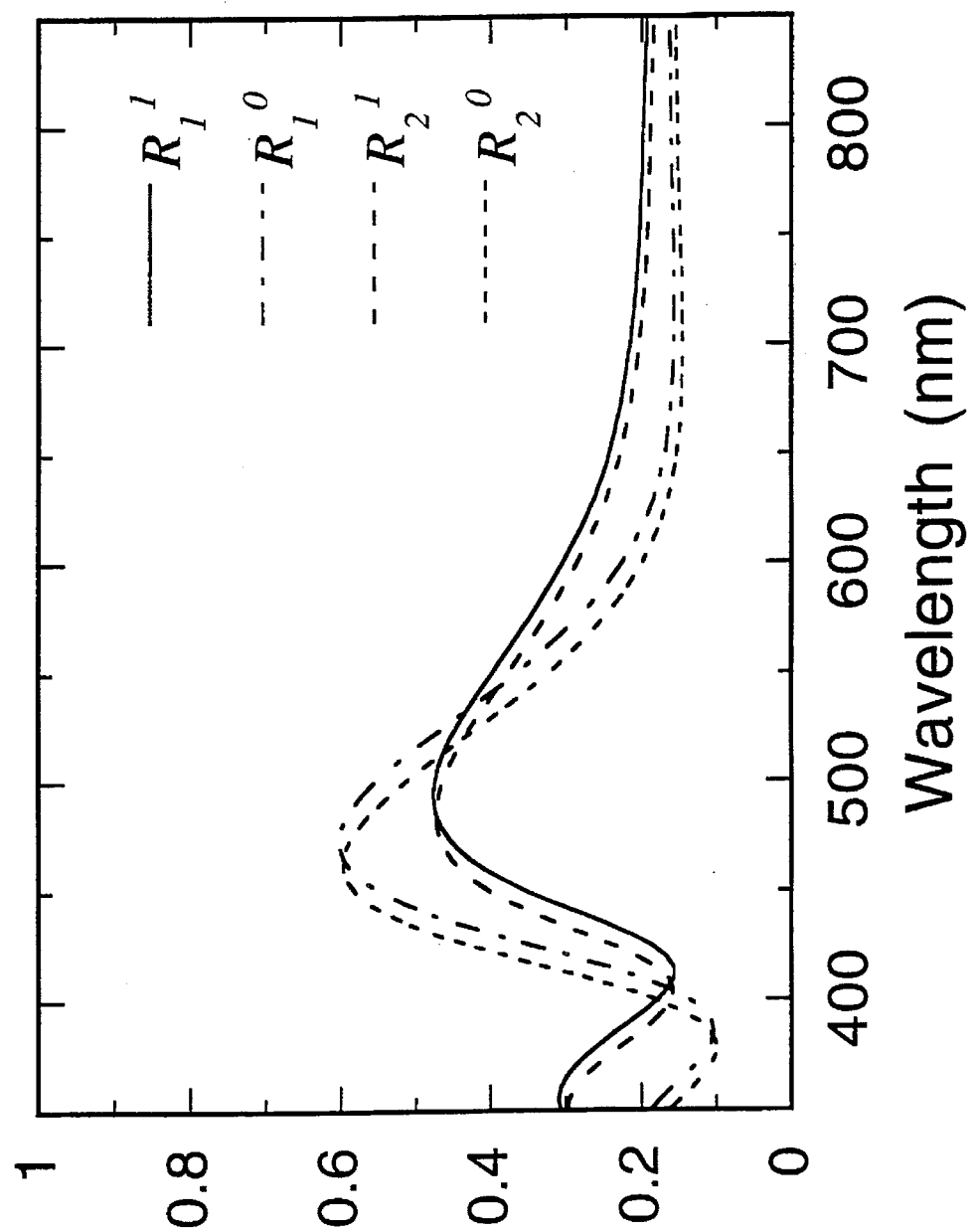

Example 9 is a write-once optical recording medium having an in-focus plane visible logo coating and a 3-layer recording coating made of $TeO_x$ and $Nb_2O_5$ materials. Some of the layers in the logo coating are also used in the recording coating. The constructions parameters for the coating of Example 9 are listed in Table 3. The 95% of the first $Nb_2O_5$ layer is deposited directly onto the surface 88 of the substrate 90. A mask is introduced and used for the deposition of the remaining 5% thickness of the first $Nb_2O_5$ layer. The mask is then removed, and followed by the deposition of $TeO_x$, the second $Nb_2O_5$, and Al layers. The reflectance curves for $R_1(\lambda)$ and $R_2(\lambda)$ are plotted in FIG. 11. Clearly, $R_2(\lambda_0)$ and $R_2(\lambda_0)$ have the same value at the laser wavelength but are different in the visible part of the spectrum. The colors of the logo and background areas are greenish blue and whitish blue at the normal viewing angle. They change to blue and violet when the medium is viewed at 45° angle of incidence, respectively.

Phase-Change Optical Recording Medium Having Superimposed In-Focus Plane Visible Logos In the case of a phase change recording medium, the recording coating 86 is made of a material having two stable phases such as TeGe, TeGeAs, TeGeSb, TeSeIn, TeSeSn, TeSnPb, GaSb, etc., in combination with some dielectric materials such as,, $SiO_2$, $Al_2O_3$, $ZrO_2$, $Nb_2O_5$, etc. The logo coatings includes at least one dielectric, semiconductor or metallic layer, and can be deposited directly onto the surface 88 or be part of the recording coating 86. As the number of layers in the recording and the logo coatings increase, the colors and color change properties of the logo and the background areas can be designed to meet the desired specifications.

Magneto-Optic Recording Medium Having Superimposed In-Focus Plane Visible Logo

In the case of magneto-optic media, the recording coating 86 includes at least one layer made of a magneto-optic material such as CeSb, CeSe, CoPd, CoPt, EuO, Fe/Ag, Fe/Cu, Fe/TiN, GdCo, GdFe, GdFeBi, GdFECo, GdFeSn, GdTbFe, MnAlGe, MnBi, MnCuBi, MnGaGe, MnTiBi, TbFe, TbFeCo, TmS, TmSe, etc. In the magneto-optic media, data bits "0" and "1" are stored with the magnetic field oriented in the "up" or "down" direction. The data is read by detecting the rotation of the plane of polarization of a reflected polarized light beam. This Kerr rotation is usually less than a few degrees, and hence the signal difference between "1" and "0" is also very small. In order to keep the same optical recording properties, the logo coating and the surface 88 should have not only the same reflectance value but also the same polarization properties at the laser wavelength. The logo coating can include at least one layer made of absorbing, partially absorbing and transparent materials.

The logo coatings can be produced by physical vapor deposition processes such as evaporation or sputtering, chemical vapor deposition, laser ablation, silk-screen printing, spinning, dipping, brushing, printing or any other standard technique that is used for depositing coatings. The logos are formed by either depositing some or all the layers through a mask. Standard photo-lithographic techniques can also be used to pattern one or more layers to create a logo. Processes can also be used which define the areas on which the coating is to be deposited. For example, laser activated chemical vapor deposition can be used to deposit a coating only on that area of the substrate that has been previously heated by the laser. Alternatively, a temporary release-coated plastic substrate such as Mylar™ can be coated with the logo layers and then part of the coating can be transferred onto the optical medium to create a logo using a hot-foil transfer process or special adhesives.

The optical medium substrate may be a disk such as a CD ROM, a paper document, a plastic sheet, a credit card, bank card, or any other coatable substrate.

Numerous other embodiments may be envisaged without departing from the spirit and scope of this invention. For example, the scope of this invention includes double sided optical disks having a recording coating on both sides of the disk. In this instance, both sides are "read-sides" and can have a logo superimposed on them.

TABLE 1

Structures of optical recording media with out-of-focus plane superimposed visible logos

| | Read-only | | | | | | Write-once | | Phase-change | | Magneto-optic | |
|---|---|---|---|---|---|---|---|---|---|---|---|---|
| | 1 | | 2 | | 3 | | 4 | | 5 | | 6 | |
| Example | Material | Thick (nm) | Material | Thick (nm) | Material | Thick (nm) | Material | Thick (nm) | Material | Thick (nm) | Material | Thick (nm) |
| Logo Coating | | | | | Air | — | | | | | | |
| | | | | | $SiO_2$ | 84.3 | | | | | | |
| | | | | | $ZrO_2$ | 85.7 | | | | | Air | — |
| | | | Air | — | Ge | 5.0 | Air | — | Air | — | $Nb_2O_5$ | 25.3 |
| | | | $SiO_2$ | 125.6 | $SiO_2$ | 323.2 | $ZrO_2$ | 16.3 | $ZrO_2$ | 40.3 | $SiO_2$ | 78.8 |
| | | | $Nb_2O_5$ | 104.6 | $ZrO_2$ | 90.6 | $SiO_2$ | 84.0 | $SiO_2$ | 71.5 | $Nb_2O_5$ | 47.9 |
| | | | Ge | 4.0 | $SiO_2$ | 88.2 | $ZrO_2$ | 67.9 | $ZrO_2$ | 70.7 | $SiO_2$ | 81.1 |
| | | | $SiO_2$ | 281.6 | $ZrO_2$ | 50.6 | $SiO_2$ | 91.2 | $(SiO_2/ZrO_2)^6$ | $(94.6/70.7)^6$ | $Nb_2O_5$ | 48.0 |
| | | | $Nb_2O_5$ | 62.2 | | | | | | | | |
| | Air | — | $SiO_2$ | 56.4 | $SiO_2$ | 113.5 | $(ZrO_2/SiO_2)^5$ | $(67.9/65.0)^5$ | $SiO_2$ | 68.2 | $SiO_2$ | 77.0 |
| | Si | 108.4 | $Nb_2O_5$ | 30.6 | $ZrO_2$ | 46.1 | $ZrO_2$ | 43.7 | $ZrO_2$ | 46.4 | $Nb_2O_5$ | 21.5 |
| Substrate | Plastic | 1.1 mm | Plastic | 1.1 mm | Plastic | 1.1 mm | Plastic | 1.1 mm | Plastic | 1.1 mm | Plastic | 1.1 mm |
| Recording Coating | Al | 25.0 | Al | 25.0 | Al | 25.0 | Te | 30.0 | GaSb | 100.0 | $Nb_2O_5$ TbFeCo | 50.0 126.0 |

TABLE 2

Structures of optical recording media with in-focus plane superimposed visible logos

| | Read-only 7 | | | | Read-only 8 | | | | Write-once 9 | | | |
|---|---|---|---|---|---|---|---|---|---|---|---|---|
| | No logo | | With Logo | | No logo | | With Logo | | No logo | | With Logo | |
| Example | Material | Thick (nm) | Material | Thick (nm) | Material | Thick (nm) | Material | Thick (nm) | Material | Thick (nm) | Material | Thick (nm) |
| Incident Medium | Air | — | Air | — | Air | — | Air | — | Air | — | Air | — |
| Substrate | Plastic | 1.1 mm | Plastic | 1.1 mm | Plastic | 1.1 mm | Plastic | 1.1 mm | Plastic | 1.1 mm | Plastic | 1.1 mm |
| Logo & Recording Coatings | Al | 25.0 | Au | 25.0 | Inconel | 10.0 | Inconel | 10.0 | $Nb_2O_5$ | 70.0 | $Nb_2O_5$ | 70.0 |
| | | | Al | 25.0 | $Nb_2O_5$ | 157.3 | $Nb_2O_5$ | 151.0 | $TeO_x$ | 35.0 | $TeO_x$ | 35.0 |
| | | | | | Al | 25.0 | Al | 25.0 | $Nb_2O_5$ | 65.6 | $Nb_2O_5$ | 62.7 |
| | | | | | | | | | Al | 25.0 | Al | 25.0 |

TABLE 3

Color and recording performance of optical recording media described in Table 1

| | | Read-only | | | | | | Write-once | | Phase-change | | Magneto-optic | |
| --- | --- | --- | --- | --- | --- | --- | --- | --- | --- | --- | --- | --- | --- |
| | | 1 | | 2 | | 3 | | 4 | | 5 | | 6 | |
| Example | | No Logo | With logo | No Logo | With Logo | No Logo | With Logo | No logo | With Logo | No Logo | With Logo | No Logo | With Logo |
| Color Performance | "1" bit at 0° | x=0.308 y=0.314 L=0.872 | x=0.345 y=0.353 L=0.783 | x=0.308 y=0.314 L=0.872 | x=0.317 y=0.203 L=0.280 | x=0.308 y=0.314 L=0.872 | x=0.326 y=0.400 L=0.416 | x=0.310 y=0.316 L=0.114 | x=0.284 y=0.357 L=0.752 | x=0.308 y=0.319 L=0.523 | x=0.324 y=0.381 L=0.888 | x=0.287 y=0.286 L=0.274 | x=0.214 y=0.232 L=0.435 |
| | "1" bit at 45° | x=0.308 y=0.314 L=0.872 | x=0.345 y=0.356 L=0.785 | x=0.308 y=0.314 L=0.872 | x=0.400 y=0.334 L=0.380 | x=0.308 y=0.314 L=0.872 | x=0.305 y=0.213 L=0.246 | x=0.310 y=0.316 L=0.129 | x=0.250 y=0.270 L=0.566 | x=0.308 y=0.318 L=0.524 | x=0.270 y=0.323 L=0.732 | x=0.293 y=0.290 L=0.273 | x=0.224 y=0.194 L=0.303 |
| | "0" bit at 0° | — | — | — | — | — | — | x=0.306 y=0.316 L=0.440 | x=0.263 y=0.400 L=0.679 | x=0.307 y=0.320 L=0.393 | x=0.331 y=0.405 L=0.872 | — | — |
| | "0" bit at 45° | — | — | — | — | — | — | x=0.306 y=0.316 L=0.442 | x=0.183 y=0.222 L=0.364 | x=0.307 y=0.320 L=0.400 | x=0.253 y=0.326 L=0.679 | — | — |
| Recording Performance at 800 nm | Absorptance | | | | | | | 0.647 | 0.647 | 0.606 | 0.603 | 0.717 | 0.717 |
| | Reflectance at "0" | | | | | | | 0.114 | 0.114 | 0.283 | 0.282 | — | — |
| | Reflectance at "1" | 0.794 | 0.772 | 0.794 | 0.720 | 0.794 | 0.710 | 0.353 | 0.353 | 0.394 | 0.397 | 0.282 | 0.282 |
| | $\theta_k(°)$ | | | | | | | | | | | 0.71° | 0.71° |
| | SNR | | | | | | | | | | | 0.0066 | 0.0066 |

TABLE 4

Color and recording performance of optical recording media described in Table 3

| | | Read-only 7 | | Read-only 8 | | Write-once 9 | |
| --- | --- | --- | --- | --- | --- | --- | --- |
| Example | | No Logo | With logo | No Logo | With logo | No Logo | With Logo |
| Color Performance | "1" bit at 0° | x=0.308 y=0.314 L=0.872 | x=0.395 y=0.405 L=0.755 | x=0.246 y=0.127 L=0.139 | x=0.298 y=0.168 L=0.163 | x=0.236 y=0.282 L=0.356 | x=0.214 y=0.250 L=0.289 |
| | "1" bit at 45° | x=0.308 y=0.314 L=0.872 | x=0.393 y=0.403 L=0.757 | x=0.308 y=0.185 L=0.181 | x=0.368 y=0.250 L=0.226 | x=0.230 y=0.250 L=0.295 | x=0.204 y=0.174 L=0.132 |
| | "0" bit at 0° | — | — | — | — | x=0.285 y=0.341 L=0.379 | x=0.268 y=0.321 L=0.334 |
| | "0" bit at 45° | — | — | — | — | x=0.274 y=0.312 L=0.340 | x=0.247 y=0.256 L=0.213 |
| Recording Performance at 800 nm | Absorptance | | | | | 0.765 | 0.774 |
| | Reflectance at "0" | | | | | 0.161 | 0.152 |
| | Reflectance at "1" | 0.794 | 0.881 | 0.805 | 0.795 | 0.198 | 0.188 |

What we claim is:

1. An optical medium for storing encoded data, wherein the encoded data is comprised of '0' and '1' data bits, a '0' data bit being represented by a different level of reflectance of the optical medium than a '1' data bit, wherein a '1' data bit corresponds to a reflectance greater than or equal to a minimum threshold reflectance $R^1_{min}$ and a '0' data bit corresponds to a reflectance less than or equal to a maximum threshold reflectance $R^0_{max}$ and having a visible logo thereon in the form of a geometric design, pattern, inscription, or the like, the optical medium comprising:

a substrate having a read-side and a non read-side;

a reflective recording coating carried by the non read-side of the substrate; and, a logo coating covering one or more predetermined areas of the read side of the substrate for producing the visible logo carried by the read-side of the substrate, the coating being comprised of one or more layers wherein the layer material and layer thickness of each of the one or more layers is chosen such that the areas of the Optical medium covered by the logo coating have a reflectance at a read/write laser wavelength, the reflectance being greater than or equal to $R^1_{min}$ for a '1' data bit and the reflectance being less than or equal $R^0_{max}$ for a '0' data bit, in order to distinguish between the '0' and '1' data bits encoded in the optical medium; the areas of the optical medium covered by the logo coating having a reflectance, at least at a predetermined visible wavelength other than the read/write laser wavelength, that is substantially different from the reflectance of areas of the optical medium not covered by the logo coating such that there is a visible luminous and/or color contrast between areas of the optical medium covered and not covered by the logo coating.

2. An optical medium having a visible logo thereon as defined in claim 1, wherein the coating for producing the visible logo is applied to the substrate through a mask, thereby only covering predetermined locations of the read-side substrate.

3. An optical medium having a visible logo thereon as defined in claim 1, wherein the logo coating is an interference coating being suitable for producing an inherent color shift with a change of viewing angle.

4. An optical medium having a visible logo thereon as defined in claim 1, wherein the logo coating comprises at least one of a non-absorbing dielectric material, a semiconductor material, a metal, an ink and an organic dye material.

5. An optical medium having a visible logo thereon as defined in claim 1, wherein the logo coating includes a thin, semiconductor or metallic layer, the coating having a high transmittance in the reading or writing wavelengths and suitable reflection in the visible spectral region such that them is a strong visible contrast between areas of the optical medium covered with the logo coating and the areas not covered with the logo coating.

6. An optical medium having a visible logo thereon as defined in claim 1, wherein the logo coating comprises a layer of material that has a refractive index n at a laser reading wavelength of $\lambda_0$, and a wherein the material has a thickness t such that the optical thickness of the layer nt, is approximately equal to an integer multiple of $\lambda_0/2$.

7. An optical medium having a visible logo defined thereon as defined in claim 1, wherein the logo coating substantially preserves the polarization of an optical signal at the read or write wavelength passing through it.

8. An optical medium having a visible logo thereon as defined in claim 1, wherein the coating for producing the visible logo is formed by a photolithographic process.

9. Optical medium for storing encoded data, wherein the encoded data is comprised of '0' and '1' data bits, a '0' data bit being represented by a different level of reflectance of the optical medium than a '1' data bit, wherein a '1' data bit corresponds to a reflectance greater than or equal to a minimum threshold reflectance $R^1_{min}$ and a '0' data bit corresponds to a reflectance less than or equal to a maximum threshold reflectance $R^0_{max}$ and having a visible logo thereon in the form of a geometric design, pattern, inscription, or the like, the optical medium, comprising:

a substrate having a read-side and a non read-side;

wherein the non-read side carries a first reflective recording coating covering a first predetermined area; and, a second reflective recording coating covering at least a second predetermined area, the combination of the first and second reflective coatings producing the visible logo when viewed from the read-side of the substrate;

the first and the second reflective recording coatings each being comprised of one or more layers wherein the layer material and layer thickness of each of the one or more layers is chosen such that the areas of the optical medium covered by the reflective recording coatings have a reflectance at a read/write laser wavelength, the reflectance being greater than or equal to $R^1_{min}$ for a '1' data bit and the reflectance being less than or equal to $R^0_{max}$ for a '0' data bit, in order to distinguish between the "0" and "1" data bits encoded in the optical medium; the areas of the optical medium covered by the first reflective recording coating having a reflectance, at least at a predetermined visible wavelength other than the read/write laser wavelength, that is substantially different from the reflectance of areas of the optical medium covered by the second reflective recording coating, such that there is a visible luminous and/or color contrast between said areas.

10. An optical medium having a visible logo as defined in claim 9, wherein the first and the second materials are different materials.

11. An optical medium having a visible logo as defined in claim 9 wherein the first reflective coating and the second reflective coating are of different thicknesses.

12. An optical medium having a visible logo as defined in claim 9 wherein one of the first and second coatings are applied through a mask, thereby only covering predetermined locations on the medium.

13. An optical medium having a visible logo as defined in claim 9, wherein the first reflective coating comprises aluminum or silver, and the second reflective material comprises gold.

14. An optical medium having a visible logo as defined in claim 9, wherein the first reflective coating comprises gold, and the second reflective material comprises aluminum or silver.

15. An optical medium having a visible logo as defined in claim 9, wherein at least some of the first reflective material is in contact with some of the second reflective material.

16. An optical medium having a visible logo as defined in claim 9, wherein the second reflective coating is applied through a mask, and wherein the first reflective coating coats and covers the second reflective coating.

17. An optical medium having a visible logo thereon as defined in claim 9, wherein the logo coming is an interference coating being of a thickness and material suitable for producing an inherent color shift with a change of viewing angle.

18. A method of providing a laser readable optical medium for storing encoded data, wherein the encoded data is comprised of '0' and '1' data bits, a '0' data bit being represented by a different level of reflectance of the optical medium than a '1' data bit, wherein a '1' data bit corresponds to a reflectance greater than or equal to a minimum threshold reflectance $R^1_{min}$ and a '0' data bit corresponds to a reflectance less than or equal to a maximum threshold reflectance $R^0_{max}$ and having a visible logo thereon in the form of a geometric design, pattern, inscription, or the like, the optical, medium, comprising the steps of:

a) providing a substrate having a read side and a non-read side, the nonread side having a reflective recording coating;

b) applying a reflective logo coating covering one or more predetermined areas of the read side of the substrate for producing the visible logo carried by the read-side of the substrate, the coating being comprised of one or more layers wherein the layer material and layer thickness of each of the one or more layers is chosen such that the areas of the optical medium covered by the logo coating have a reflectance at a read/write laser wavelength, the reflectance being greater than or equal to $R^1_{min}$ for a '1' data bit and the reflectance being less than or equal $R^0_{max}$ for a '0' data bit, in order to distinguish between the '0' and '1' data bits encoded in the optical medium; the areas of the optical medium covered by the logo coating having a reflectance, at least at a predetermined visible wavelength other than the read/write laser wavelength, that is substantially different from the reflectance of areas of the optical medium not covered by the logo coating such that there is a visible luminous and/or color contrast between areas of the optical medium covered and not covered by the logo coating.

19. A thin film logo for placement on an optical medium having a recording layer, comprising:

a substrate; and, a coating carried by the substrate for transfer from the substrate to the optical medium, the coating having sufficiently high transmittance at a laser wavelength such that light at this wavelength passing through the coated substrate toward the optical medium and reflected back through the coating from the medium is substantially transmitted and unchanged by the coating, so that the data can be detected, said coating having a visible contrast from the recording layer.

20. A thin film logo as defined in claim 19, wherein the coating is a release coating loosely bonded to the substrate for transfer from the substrate to the optical medium.

21. A thin film logo as defined in claim 19 including an adhesive at least partially covering a side of the coated substrate so that the coating can be permanently affixed to the optical medium.

22. A method of providing an optical medium for storing encoded data, wherein the encoded data is comprised of '0' and '1' data bits, a '0' data bit being represented by a different level of reflectance of the optical medium than a '1' data bit, wherein a '1' data bit corresponds to a reflectance greater than or equal to a minimum threshold reflectance $R^1_{min}$ and a '0' data bit corresponds to a reflectance less than or equal to a maximum threshold reflectance $R^0_{max}$ and having a visible logo thereon in the form of a geometric design, pattern, inscription, or the like, the optical medium, the method comprising the steps of:

providing a substrate having a read-side and a non read-side;

covering a first predetermined area of the non-read side of the substrate with a first reflective recording coating; and, covering a second predetermined area of the non-read side of the substrate with a second reflective recording coating, the combination of the first and second reflective coatings producing the visible logo when viewed from the read-side of the substrate;

the first and the second reflective recording coatings each being comprised of one or more layers wherein the layer material and layer thickness of each of the one or more layers is chosen such that the areas of the optical medium covered by the reflective recording coatings have a reflectance at a read/write laser wavelength, the reflectance being greater than or equal to $R^1_{min}$ for a '1' data bit and the reflectance being less than or equal to $R^0_{max}$ for a '0' data bit, in order to distinguish between the "0" and "1" data bits encoded in the optical medium; the areas of the optical medium covered by the first reflective recording coating having a reflectance, at least at a predetermined visible wavelength other than the read/write laser wavelength, that is substantially different from the reflectance of areas of the optical medium covered by the second reflective recording coating, such that there is a visible luminous and/or color contrast between said areas.

* * * * *